(12) United States Patent
Savage et al.

(10) Patent No.: US 8,709,248 B2
(45) Date of Patent: Apr. 29, 2014

(54) MOLDED FILTER END CAP AND METHOD OF MANUFACTURE

(75) Inventors: Jeffrey Savage, Warrington (GB);
Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 2055 days.

(21) Appl. No.: 11/776,098

(22) Filed: Jul. 11, 2007

(65) Prior Publication Data
US 2009/0014375 A1    Jan. 15, 2009

(51) Int. Cl.
*B01D 35/30* (2006.01)
*B01D 37/00* (2006.01)

(52) U.S. Cl.
USPC .............................. 210/238; 210/348; 210/767

(58) Field of Classification Search
USPC ........................................................ 210/238
See application file for complete search history.

(56) References Cited

U.S. PATENT DOCUMENTS

| | | | |
|---|---|---|---|
| 3,616,618 A | 11/1971 | Gronholz et al. | |
| 4,746,339 A * | 5/1988 | Millard | 55/302 |
| 5,120,337 A | 6/1992 | Benzler et al. | |
| 5,167,683 A | 12/1992 | Behrendt et al. | |
| 5,190,651 A | 3/1993 | Spencer et al. | |
| 5,547,480 A | 8/1996 | Coulonvaux | |
| 7,090,708 B2 | 8/2006 | Winter et al. | |
| 2003/0000881 A1 * | 1/2003 | Lee | 210/233 |
| 2003/0226800 A1 * | 12/2003 | Brown et al. | 210/497.01 |

FOREIGN PATENT DOCUMENTS

| | | |
|---|---|---|
| DE | 3405719 A1 | 8/1985 |
| JP | S59-022631 | 2/1984 |
| JP | 61-245809 A | 1/1986 |
| JP | 62-091222 A | 4/1987 |
| JP | 2004-182277 A | 7/2004 |
| WO | WO 2009/009377 A2 | 1/2009 |

OTHER PUBLICATIONS

Merriam-Webster Online Dictionary, http://www.meriam-webster.com/dictionary/grommet.*

* cited by examiner

*Primary Examiner* — Krishnan S Menon
*Assistant Examiner* — Allison Fitzsimmons
(74) *Attorney, Agent, or Firm* — Reinhart Boerner Van Deuren P.C.

(57) ABSTRACT

A filter element including a filter media, a first end cap, and a second end cap is provided. The filter media has first and second filter ends. The first end cap is attached to the first filter end and the second end cap is attached to the second filter end. The second end cap is formed from a molded material and includes a handle structure unitarily molded therein. The handle structure includes a flange with a void formed at least partially transversely therethrough. The void is molded without a mold split such that no mold split parting line is formed on the second end cap. In one embodiment, the void is formed in the flange of the handle structure using a grommet molded therein.

13 Claims, 9 Drawing Sheets

MOLDED FILTER END CAP AND METHOD OF MANUFACTURE

FIELD OF THE INVENTION

This invention generally relates to filter elements and, more particularly, molded filter elements.

BACKGROUND OF THE INVENTION

As known in the art and exemplified in U.S. Pat. Nos. 5,547,480, 5,167,683 and 5,120,337, filter elements or filter cartridges (collectively referred to as "filter elements") are used to remove particulates from a fluid such as, for example, air. The filter elements come in a variety of different shapes, sizes and configurations depending on their particular application and use.

In some circumstances, the filter elements include a handle or similar structure in order to facilitate the removal of the filter element from a housing as exemplified in U.S. Pat. Nos. 7,090,708, 5,190,651 and 3,616,618. The Applicant has developed improvements for filter elements and, in particular, the handle therefore. The present disclosure is directed to these improvements.

BRIEF SUMMARY OF THE INVENTION

In one aspect, a filter element including a filter media, a first end cap, and a second end cap is provided. The filter media has first and second filter ends. The first end cap is attached to the first filter end and the second end cap is attached to the second filter end. The second end cap is formed from a molded material and includes a handle structure unitarily molded therein. The handle structure includes a flange with a void formed at least partially transversely therethrough. The void is molded without a mold split such that no mold split parting line is formed on the second end cap.

In another aspect, a filter element including a filter media, a first end cap, and a second end cap is provided. The filter media has first and second filter ends. The first end cap is attached to the first filter end and the second end cap is attached to the second filter end. The second end cap is formed from a molded material and includes a handle structure unitarily molded therein. The handle structure includes a flange having a grommet molded therein. The grommet defines an aperture passing transversely through the flange.

In yet another aspect, a method of molding an end cap for a filter element is provided. The method includes the step of inserting a grommet into a mold body such that an outer surface of the grommet sealingly engages opposing walls of the mold body and forms an internal cavity radially inwardly of the grommet. The method further includes the step of dispensing an end cap material into the mold body and around the grommet, the internal cavity remaining free of the end cap material. The method also includes the step of collectively extracting the end cap material and the grommet from the mold body after the end cap material has solidified such that the grommet provides a void.

In a still further aspect, a method of molding an end cap for a filter element is provided. The method includes the step of inserting a tool into a mold body such that the tool occupies a portion of the mold body. The method further includes the step of dispensing an end cap material into the mold body and around the tool, the tool preventing the portion of the mold body occupied by the tool from receiving the end cap material. The method also includes removing the tool from the mold body after the end cap material has solidified. The method also includes extracting the end cap material from the mold body after the tool has been removed such that the portion of the mold body previously occupied by the tool provides a finger gripping aperture.

In another aspect, a filter element assembly including a filter housing and a filter element is provided. The filter element includes a filter media, a first end cap, and a second end cap. The filter media has first and second filter ends. The first end cap is attached to the first filter end and the second end cap attached to the second filter end. The second end cap is formed from a molded material and includes a handle structure unitarily molded therein. The handle structure includes a flange having a void formed transversely through the flange. The second end cap further includes at least two locating lugs. The locating lugs collectively provide sufficient width to retain the filter element in position within the filter housing.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
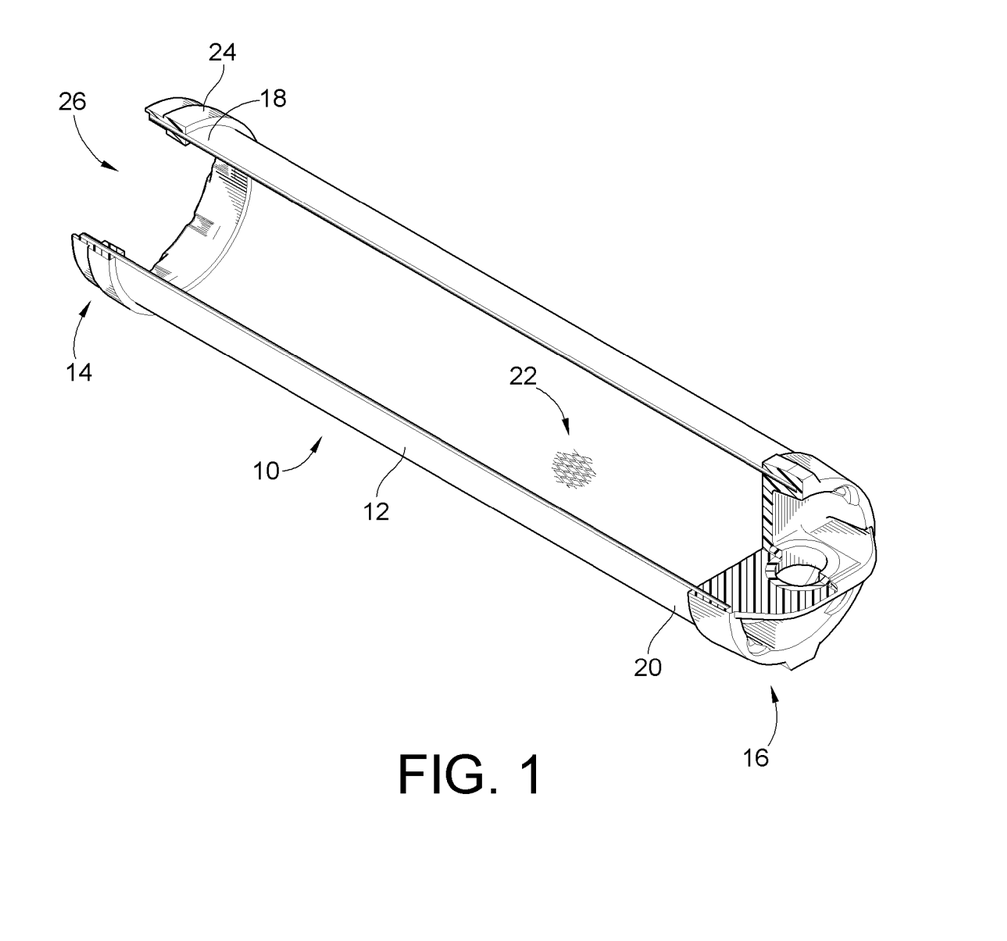
FIG. 1 is a perspective view of an exemplary embodiment of a filter element in accordance with the teachings of the present invention.

Referring to FIG. 1, a filter element 10 is illustrated. The filter element 10 is generally employed to remove particulate, contaminants and other debris undesirably present in a fluid. In the illustrated embodiment of FIG. 1, the filter element 10 is configured to remove the aforementioned particles from a stream of air. Even so, features of the filter element 10 disclosed herein may also be suitably employed on and in other types of filter elements such as, for example, those filter elements removing undesirable particles from a liquid. The filter element 10 may be suitably used in, for example, the housing described and illustrated in U.S. Pat. No. 7,090,708, which is incorporated herein in its entirety.

The filter element 10 of FIG. 1 generally comprises a cylindrical ring of filter media 12, a lower end cap 14, and an upper end cap 16. The lower end cap 14 is attached to a lower end 18 of the filter media 12 while the upper end cap 16 is attached to an upper end 20 of the filter media. In the illustrated embodiment of FIG. 1, opposed ends of the filter media 12 are potted and thereby embedded in each of the end caps 14, 16 while the filter element 10 is being formed. Depending on the application for which the filter element 10 will be used, the filter media 12 may be pleated, fluted or have some other configuration known to those skilled in the art. In addition, the filter media 12 may also be formed from either a synthetic or natural fiber. To provide structural support, the filter media 12 may be internally and/or externally supported with a tubular plastic and/or metal support 22 (a small, cut-away portion of which is illustrated in FIG. 1). The support 22 may be in the form of, for example, a wire mesh, plastic cross members, an apertured metal sheet, and the like.

Figure 6:
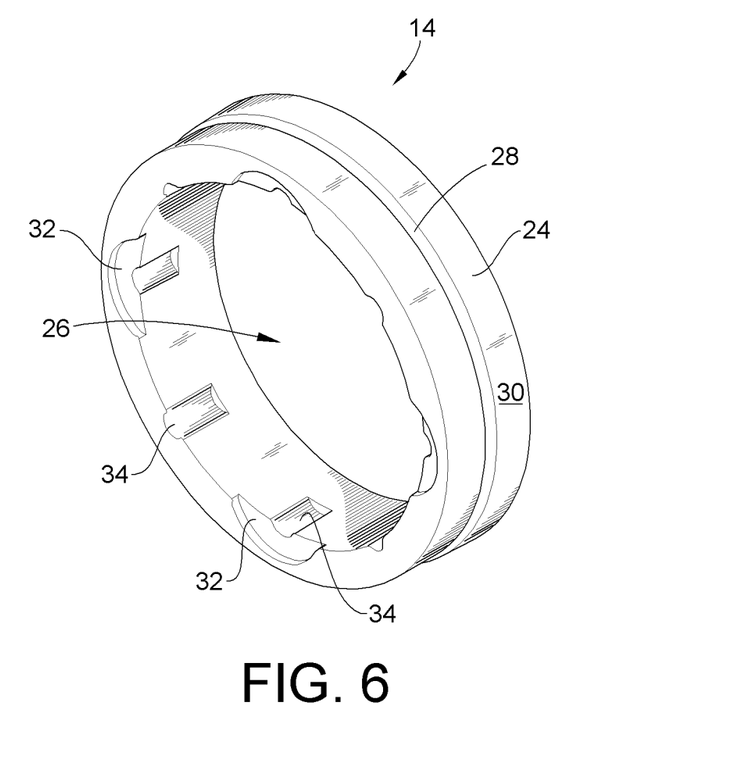
FIG. 6 is a perspective view of a lower end cap from the filter element of FIG. 1.

The lower end cap 14, which is also illustrated in FIG. 6, is generally annularly shaped. As such, the lower end cap 14 includes side wall 24 extending around a central aperture 26. The central aperture 26 permits air to flow either into, or out of, the filter element 10 depending on whether the filter element is configured as an inside-out or outside-in filter element.

In the illustrated embodiment of FIG. 6, the lower end cap 14 includes a circumferential shoulder 28 formed in an outer surface 30. The lower end cap 14 also includes several radially-outwardly extending semi-circular recesses 32 and several axially-extending grooves 34 formed in the side wall 24. The recesses 32 and grooves 34 are formed as a result of media stand-offs on the mold body. The media stand-offs are generally employed to orient the filter media both axially and radially during the molding process. The lower end cap 14 may be formed from a variety of suitable materials such as, for example, polyurethane, plastic, plastisol, and rubber.

Figure 2:
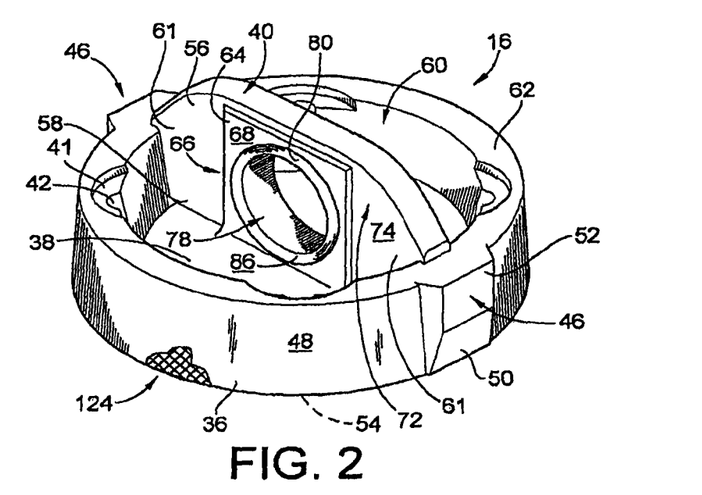
FIG. 2 is a perspective view of an upper end cap from the filter element of FIG. 1, the upper end cap including a grommet molded therein to form a finger gripping aperture.

Referring to FIG. 2, the upper end cap 16 is illustrated. In the illustrated embodiment of FIG. 2, the upper end cap 16 includes a side wall 36, a floor 38, and a handle structure 40. Like the lower end cap 14, the upper end cap 16 includes several radially-outwardly extending semi-circular recesses 41 and several axially-extending grooves 42. The upper end cap 16 also includes at least two locating lugs 46 generally formed on an outer surface 48 of the side wall 36.

In the illustrated embodiment of FIG. 2, a pair of radially-outwardly projecting locating lugs 46 are included on the upper end cap 16. While other configurations are possible, the locating lugs 46 in FIG. 2 include a ramped or chamfered lower portion 50 and a flat upper portion 52. The chamfered lower portion 50 has a has a decreasing profile as the chamfered lowered portion progresses toward a bottom 54 of the upper end cap 16. The taper of the chamfered lower portion 50 ensures that the filter element 10 may be inserted into the filter housing (not shown) without damaging end cap material.

Figure 3:
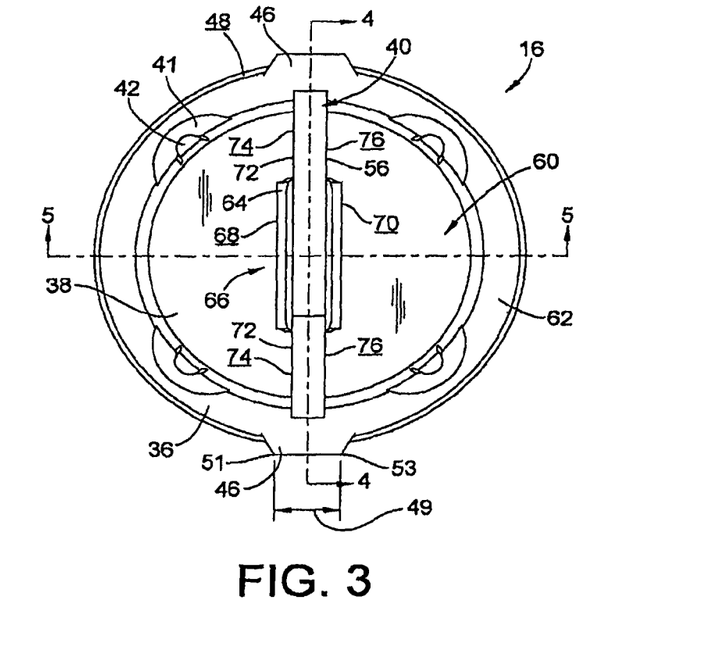
FIG. 3 is a top plan view of the upper end cap of FIG. 2.

The pair of locating lugs 46 are generally located about one hundred and eighty degrees apart on the side wall 36 and have a sufficient width 49, measured from one edge 51 to another 53 as shown in FIG. 3, such that the pair of lugs are able to center the filter element 10 within the filter housing and prevent transverse movement of the filter element 10 within the housing. Also, the pair of locating lugs 46 are able to prevent the filter element 10 from moving when the filter element is seated in, and engaged with, the filter housing. In other words, the pair of locating lugs 46 in FIG. 2 have a configuration that keeps the filter element 10 properly fitted in, and oriented relative to, the filter housing.

Figure 4:
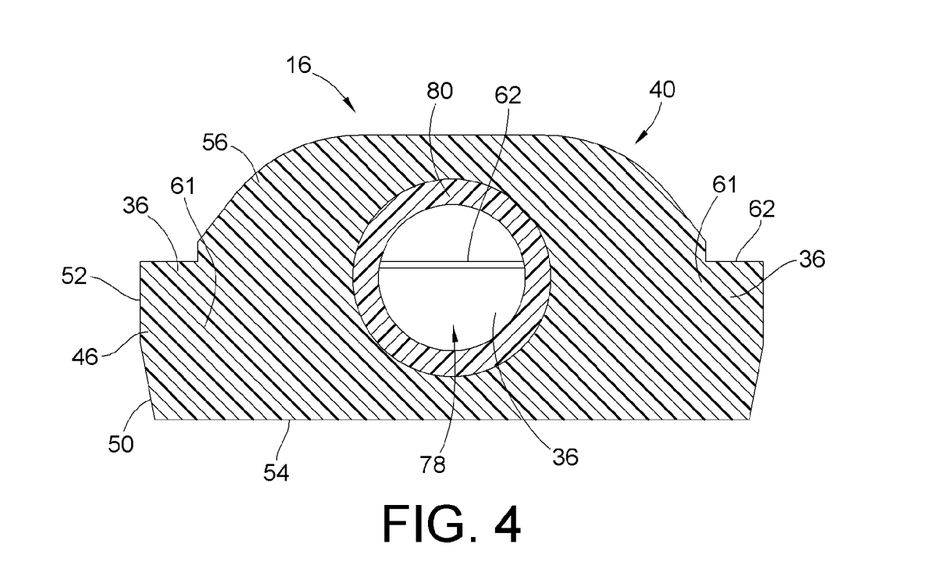
FIG. 4 is a cross section view of the upper end cap of FIG. 3 taken generally along line 4-4.

The handle structure 40 includes a flange 56 having a bottom 58 and opposing ends 61. In the illustrated embodiment, the bottom 58 of the flange 56 is unitarily molded with the floor 38. In addition, the lower portion of the opposing ends 61 are unitarily molded with the side wall 36. As depicted in FIGS. 2 and 3, the floor 38 and the side wall 36 collectively form a recess 60 in the second end cap 16. The flange 56 of the handle structure 40 is oriented generally transverse to the floor 38 and, by also extending across the middle thereof, divides and may bisect the recess 60 as shown. An upper portion of the flange 56 projects above a rim 62 of the side wall 36 as shown in FIGS. 2 and 4. If desired, the opposing ends 61 of the flange 56 may be aligned with the locating lugs 46 as shown in FIGS. 2 and 3.

Referring to FIG. 3, the flange 56 includes a thicker portion 64 measured from one surface 68 of the flange to another 70 in a central portion 66 of the flange. The thicker portion 64 in the central portion 66 of the flange 56 is adjacent to a normally thick portion 74 of the flange 56 measured from one surface 74 of the flange to another 76 outside the central portion 66. The thicker portion 64 provides strength and durability to the flange 56 proximate a finger gripping aperture 78 passing therethrough. In the illustrated embodiment of FIG. 2, the thicker portion 64 has a generally square shape while the finger gripping aperture 78 has a generally circular shape. However, other shapes may be suitably employed for each of these structures.

As shown in FIG. 2, the finger gripping aperture 78 passes transversely, and more specifically perpendicularly, through the flange 56. The finger gripping aperture 78 generally opens up toward diametrically opposed portions of the side wall 36. The finger gripping aperture 78 is molded without a mold split such that no mold split parting line can be formed on the upper end cap 16, if desired. The process of forming the upper end cap 16 permitting this desirable result is more fully explained below.

The finger gripping aperture 78 in the flange 56 of the handle structure 40 facilitates the quick, easy and convenient removal or insertion of the filter element 10 from or into a corresponding filter housing (not shown). In the illustrated embodiment of FIGS. 2 and 4-5, the finger gripping aperture 78 is sized to receive a single finger of a user. Even so, the finger gripping aperture 78 may be formed to accommodate several fingers if desired. By inserting one or more fingers into the finger gripping aperture 78, the user is able to obtain a firm grip on the filter element 10 when, for example, inspecting and/or replacing the filter element 10. As shown in FIG. 4, a portion of the finger gripping aperture 78 is disposed above the rim 62 of the side wall 36.

Figure 5:
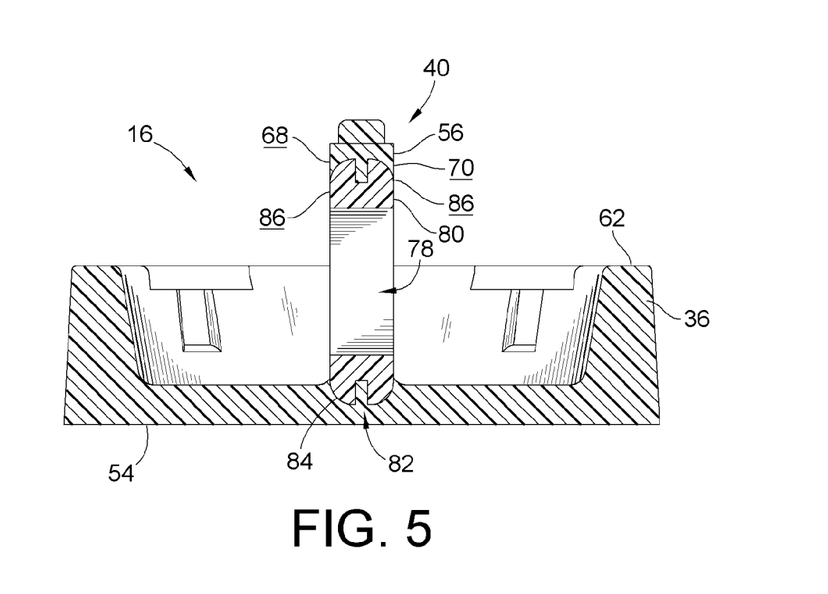
FIG. 5 is a cross section view of the upper end cap of FIG. 3 taken generally along line 5-5.

In the illustrated embodiment of FIGS. 2 and 5, the finger gripping aperture 78 in the flange 56 is formed by integrally molding a grommet 80 in the flange. The grommet 80 is formed from a variety of suitable elastomeric materials such as, for example, rubber or plastic. As shown in FIG. 4, the grommet 80 includes a groove 82 progressing circumferentially around an outer periphery 84 of the grommet 80. As shown in FIG. 5, the groove 82 of the grommet 80 receives molded material during the end cap molding process. When the molded material has solidified or hardened, the grommet 80 is interlocked with the flange 56 of the handle structure 40. Therefore, the finger gripping aperture 78 in the flange 56 of the handle structure 40 is generally defined by the grommet 80.

As shown in FIGS. 2 and 5, after the grommet 80 has been molded into the flange 56 an exposed grommet surface 86 remains uncovered. In the illustrated embodiment of FIG. 5, the exposed grommet surface 86 is generally planar with the surfaces 68, 70 of the thicker portion 64 adjacent to the exposed grommet surfaces. Therefore, the entire flange 56 and, in general, the handle structure 40 has a smooth, finished appearance.

Figure 7:
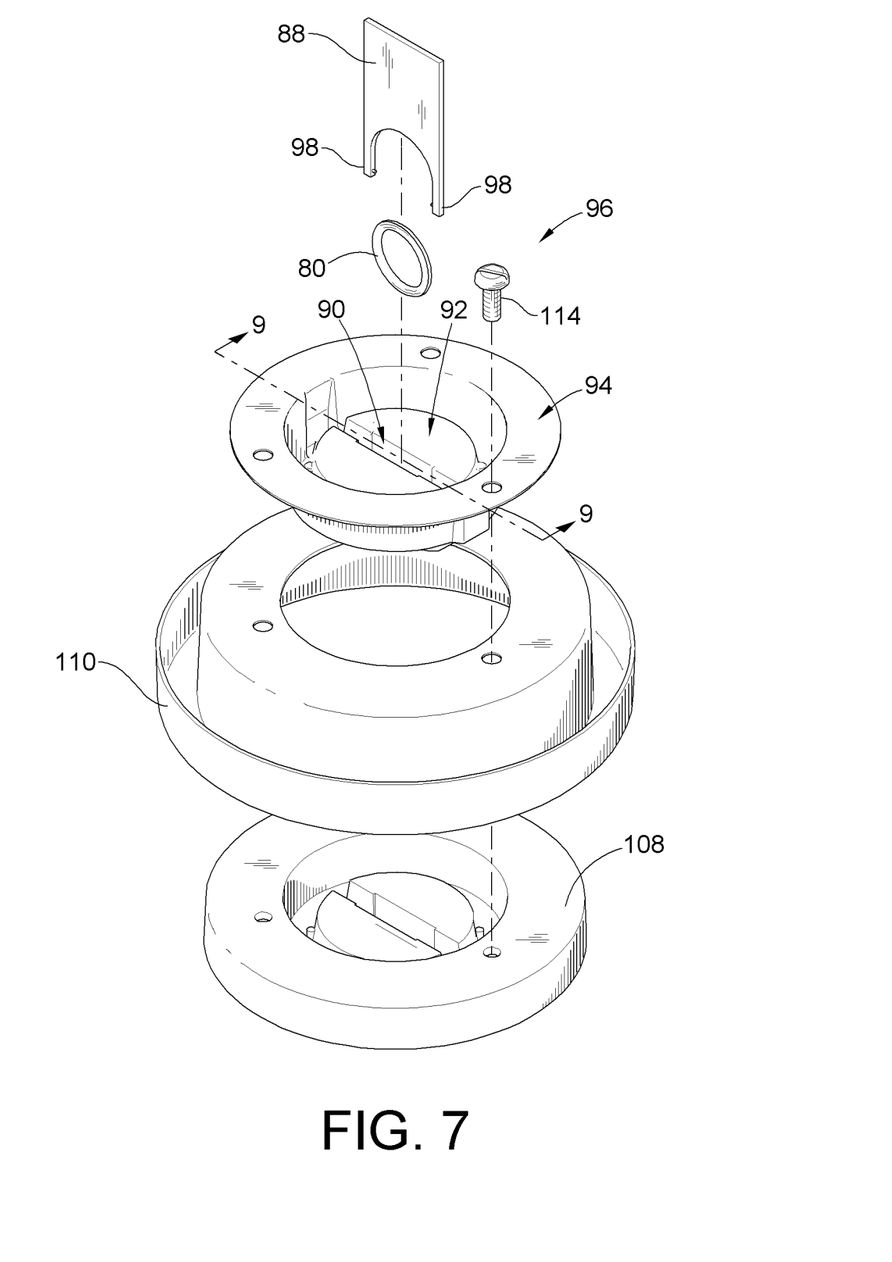
FIG. 7 is an exploded view of a mold assembly used to form the upper end cap of FIG. 2 found on the filter element of FIG. 1 and the grommet being inserted into a mold body of the mold assembly with a tool.

Referring now to FIGS. 7-10, one of the processes for molding the upper end cap 16 such that no mold split parting line may be formed on the upper end cap 16 will be generally described. As shown in FIG. 7, a tool 88 is employed to insert one of the grommets 80 through a slot 90 into a handle forming portion 92 of a mold body 94 included in a single pull mold assembly 96. The tool 88 is particularly configured to ensure that the grommet 80 is inserted into the handle forming portion 92 to the correct depth. In the illustrated embodiment of FIGS. 7 and 9, the grommet 80 is inserted to the appropriate depth when distal ends 98 of the tool 88 contact a bottom wall 100 of the mold body 94.

Figure 8:
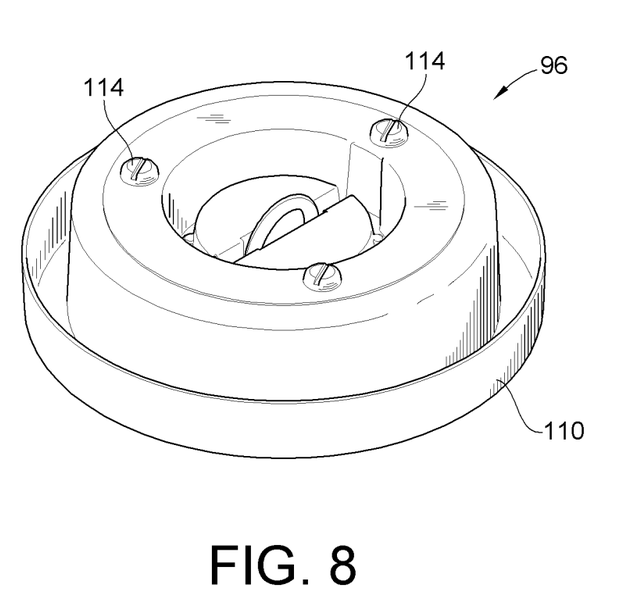
FIG. 8 is a perspective view of the mold assembly of FIG. 7 with the grommet partially inserted in the mold body.
Figure 9:
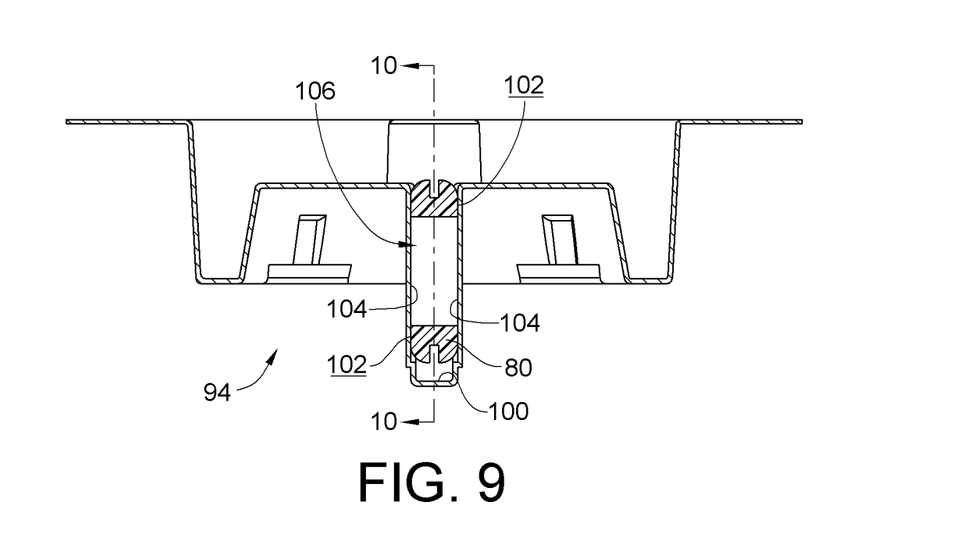
FIG. 9 is a cross section view of the grommet fully inserted in the mold body of FIG. 7 generally taken along line 9-9.
Figure 10:
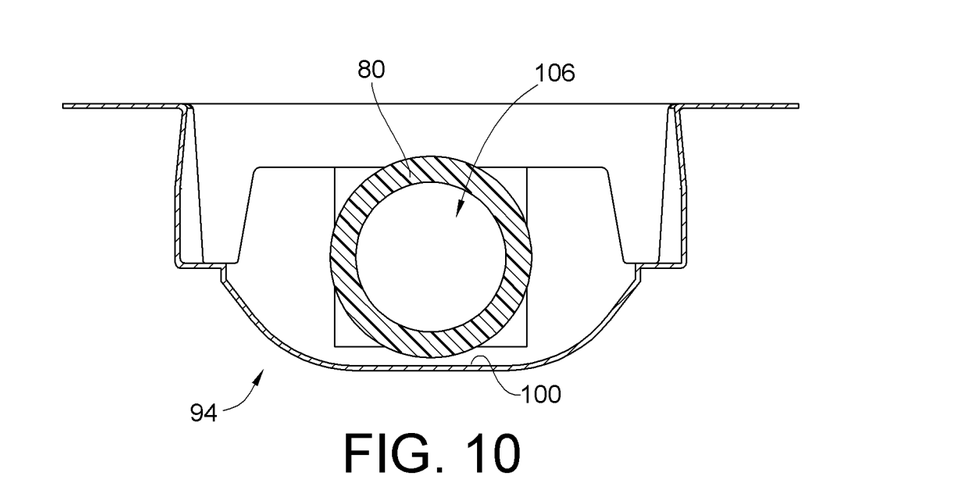
FIG. 10 is a cross section view of the grommet fully inserted in the mold body of FIG. 9 generally taken along line 10-10.

For the purpose of illustration, the grommet 80 is shown partially inserted in the handle forming portion 92 in FIG. 8 and fully inserted in the handle forming portion in FIGS. 9 and 10. When fully inserted in the handle forming portion 92, an outer surface 102 of the grommet 80 (which becomes the exposed grommet surface 86 of FIG. 2 when the grommet 80 is pulled free of the mold body 94) sealingly engages opposing walls 104 of the mold body 94 and forms an internal cavity 106 radially inwardly of the grommet.

To promote the formation of a good seal between the outer surface 102 of the grommet 80 and the opposing walls 104 of the mold body 94, a lower unit 108 (FIG. 7) of the mold assembly 96 may be used to clamp the opposing walls 104 toward the grommet 80. An intermediate member 110 of the mold assembly 96 may be employed to, for example, stabilize the mold assembly and provide a run off channel 112. If desired, the mold body 94, intermediate member 110, and the lower unit 108 may be held together with fasteners 114.

With the grommet 80 seated in the handle forming portion 92 of the mold body 94, an end cap material such as polyurethane is dispensed into the mold body. The end cap material is viscous enough to flow around the grommet 80 and fully occupy the mold body 94. However, due to the seal formed between the outer surface 102 of the grommet 80 and opposing walls 104 of the mold body 94, the internal cavity 106 remains free of the end cap material.

If desired, the end cap material that has been flowed or otherwise placed in the mold body 94 may be cured. The curing process may decrease the amount of time needed for the end cap material to solidify or harden. The curing process may also provide additional strength and/or durability to the end cap being formed. During the curing process, the end cap material may be subjected to, for example, heat, ultraviolet light, and other devices to accelerate curing.

After the end cap material is sufficiently rigid, the end cap material and the grommet 80 are collectively extracted from the mold body 94 to produce the upper end cap 16 illustrated in FIG. 2. The locating lugs 46, or other portions of the end cap 16, 116, may resiliently deform when the end cap material is pulled free of the mold body 120. Because the internal cavity 106 of the grommet 80 was shielded from the end cap material, the upper end cap 16 conveniently provides the finger gripping aperture 78 without generating parting lines that sometimes result from a mold split.

Figure 11:
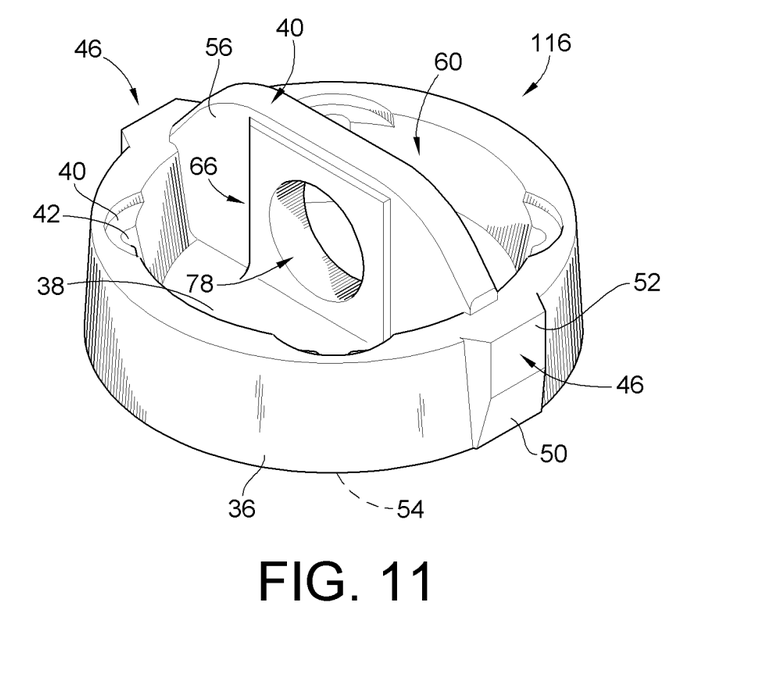
FIG. 11 is a perspective view of an alternative embodiment of an upper end cap from the filter element of FIG. 1, the upper end cap without the grommet of FIG. 2.

In an alternative embodiment as illustrated in FIG. 11, an upper end cap 116 formed without a grommet 80 may be constructed and used to form the filter element 10 depicted FIG. 1. The upper end cap 16 of FIG. 11 has many of the same structural features, which are provided with like reference numbers, as the end cap 16 of FIG. 2. In particular, the upper end cap 116 is free of parting lines formed as a result of a mold split. However, because the upper end cap 116 does not include one of the grommets, the upper end cap 116 is formed using a somewhat different molding process as described more fully below.

Figure 12:
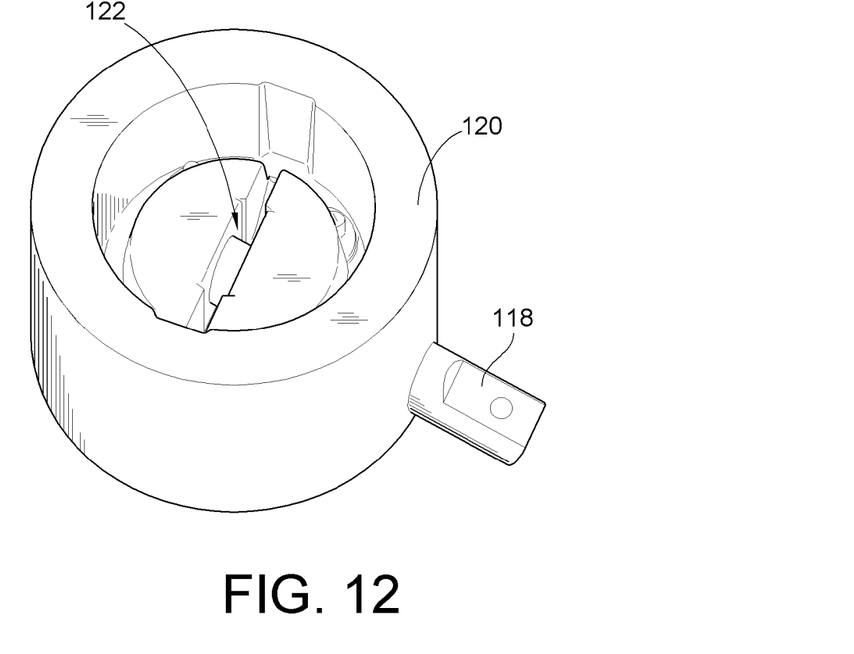
FIG. 12 is a perspective view of a cylindrical tool inserted into a mold body used to form the upper end cap of FIG. 11.
Figure 13:
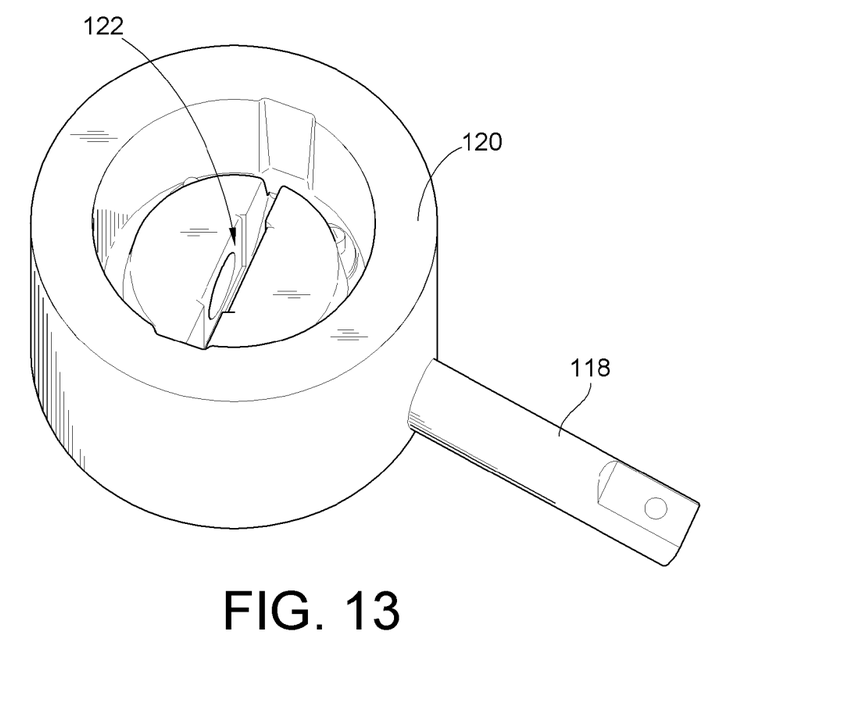
FIG. 13 is a perspective view of the cylindrical tool retracted from the mold body such that a finger gripping aperture will form in the upper end cap of FIG. 11.

Referring now to FIGS. 12 and 13, the process of forming the upper end cap 116 such that no mold split parting line is formed on the upper end cap 116 will be generally described. In this case, instead of inserting a grommet 80 in through the slot 90 of the mold body 94 as shown in FIGS. 7 and 8, a cylindrical tool 118 is inserted through a series of aligned apertures in the mold body 120. Because the cylindrical tool 118 extends entirely through the handle forming portion 122 of the mold body 120, when the end cap material is placed in the mold body 120 the area occupied by the cylindrical tool 118 remains free of end cap material. The set-offs in the recess 60 of the end cap 116 may be sufficiently high so that the cylindrical tool 118 avoids interfering with the filter media 12.

After the end cap material is sufficiently rigid, the cylindrical tool 118 is removed from the mold body 120 and the end cap material is extracted from the mold body 120. This produces the upper end cap 116 illustrated in FIG. 11. The locating lugs 46, or other portions of the end cap 16, 116, may resiliently deform when the end cap material is pulled free of the mold body 120. Because the cylindrical tool 118 occupied a part of the handle forming portion 122 of the mold body 120, the upper end cap 116 possesses the finger gripping aperture 78. The finger gripping aperture 78 has no parting lines that result from a mold split.

Regardless of the procedure used to form each of the upper end caps 16, 116 depicted in FIGS. 2 and 11, the side wall 36, the floor 38, and the flange 56 of the handle structure 40 are unitarily molded with each other. Indeed, each of these portions of the upper end cap 16, 116 are generally free of parting lines because no split mold is used. As with the lower end cap 14, each of the upper end caps 16, 116 may be formed from a variety of suitable materials such as, for example, polyurethane, plastic, plastisol, and rubber.

If extra support is needed in either of the upper and lower end caps 14, 16, 116 shown in FIGS. 2, 6 and 11, that end cap may include reinforcement structure 124, a portion of which is shown in a cut away portion of FIG. 2. The reinforcement structure 124 may be a material such as, for example, carbon fiber or a wire mesh. For aesthetic and/or structural purposes, the reinforcement structure 124 may be entirely embedded within the end caps 14, 16, 116 and, as such, hidden from view. In other circumstances, the reinforcement structure 124 may be on the outside of the end caps 14, 16, 116 and visible.

From the foregoing, those skilled in the art will recognize that the present disclosure provides significant improvements to existing filter elements. Indeed, the present filter element 10 includes end caps 16, 116 that provide an integrally or unitarily formed finger gripping aperture 78. The finger gripping aperture 78 is free of parting lines and provides a handle that is durable and easy to use.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context

What is claimed is:

1. A filter element, comprising:
a filter media having first and second filter ends;
a first end cap attached to the first filter end;
a second end cap attached to the second filter end, the second end cap formed from a molded material and including a handle structure unitarily molded therein, the handle structure including a flange with a void formed at least partially transversely therethrough, the void molded without a mold split such that no mold split parting line is formed on the second end cap; the molded material being molded directly to the filter element; and
wherein the second end cap includes a side wall progressing around the handle structure, and wherein the void opens toward diametrically opposed portions of the side wall, and wherein a portion of the void and the flange are disposed above a rim of the side wall.

2. A filter element, comprising:
a filter media having first and second filter ends;
a first end cap attached to the first filter end;
a second end cap attached to the second filter end, the second end cap formed from a molded material and including a handle structure unitarily molded therein, the handle structure including a flange with a void formed at least partially transversely therethrough, the void molded without a mold split such that no mold split parting line is formed on the second end cap; the molded material being molded directly to the filter element; and
wherein the second end cap is a closed end cap including a circumferential side wall and a solid floor extending radially inwardly from the circumferential side wall, the floor unitarily molded with a lower portion of the side wall such that the floor and side wall form a recess in the second end cap, the handle structure projecting from the floor.

3. The filter element of claim 2, wherein the flange of the handle structure in the second end cap includes a bottom and opposing ends, the bottom and a portion of the opposing ends within the recess unitarily molded with the solid floor and the circumferential side wall, respectively, and the flange intersecting a central axis such that the flange of the handle structure divides the recess.

4. A filter element comprising:
a filter media having first and second filter ends;
a first end cap attached to the first filter end;
a second end cap attached to the second filter end, the second end cap formed from a molded material and including a handle structure unitarily molded therein, the handle structure including a flange with a void formed at least partially transversely therethrough, the void molded without a mold split such that no mold split parting line is formed on the second end cap;
wherein the filter media is embedded into a side wall above a floor in surrounding relation to the handle structure.

5. A filter element, comprising:
a filter media having first and second filter ends;
a first end cap attached to the first filter end;
a second end cap attached to the second filter end, the second end cap formed from polyurethane having a free rise surface and including a handle structure unitarily molded therein, the handle structure including a flange having a grommet molded therein, the grommet defining an aperture passing transversely through the flange.

6. The filter element of claim 5, wherein the second end cap includes a circumferential side wall and a floor extending radially inwardly from the circumferential side wall, and wherein a central axis of the aperture is generally parallel to a top surface of the floor; and wherein the grommet includes an exposed grommet surface, the exposed grommet surface planar with an external surface of the flange adjacent the exposed grommet surface.

7. The filter element of claim 5, wherein the grommet includes a groove extending circumferentially around an outer periphery, the groove permitting the grommet to interlock with the flange of the handle structure; and wherein the grommet is formed from an elastomeric material.

8. The filter element of claim 5, wherein an upper portion of the flange and a portion of the aperture passing through the flange are each disposed above a rim in a sidewall of the second end cap; and wherein the aperture formed by the grommet is sized and dimensioned to receive one or more human fingers.

9. The filter element of claim 5, wherein the second end cap includes at least one locating lug including a chamfered lower portion, the chamfered lower portion having a decreasing profile as the chamfered lowered portion progresses toward a bottom of the second end cap.

10. A filter element, comprising:
a filter media having first and second filter ends;
a first end cap attached to the first filter end;
a free rise molded second urethane end cap being formed around the second filter end and including a handle structure unitarily molded therein, the handle structure including a flange with a void formed at least partially transversely therethrough.

11. The filter element of claim 10, wherein the void is molded without a mold split such that no mold split parting line is formed on the second end cap.

12. The filter element of claim 10, wherein the void in the flange is surrounded by a grommet, the grommet being molded into the flange.

13. A filter element, comprising:
- a filter media having first and second filter ends;
- a first end cap attached to the first filter end;
- a second end cap attached to the second filter end, the second end cap formed from a molded material and including a handle structure unitarily molded therein, the handle structure including a flange with a void formed at least partially transversely therethrough, the void molded without a mold split such that no mold split parting line is formed on the second end cap; the molded material being molded directly to the filter element; and
- wherein the molded material has a free rise surface formed by an open molding technique.

* * * * *